US008149918B2

(12) United States Patent
Seok et al.

(10) Patent No.: US 8,149,918 B2
(45) Date of Patent: Apr. 3, 2012

(54) METHOD OF ESTIMATING CODED BLOCK PATTERN AND METHOD OF DETERMINING BLOCK MODE USING THE SAME FOR MOVING PICTURE ENCODER

(75) Inventors: Jin Wuk Seok, Daejeon (KR); Chang Sik Cho, Daejeon (KR); Bum Ho Kim, Daejeon (KR); Hyung Kook Jun, Seoul (KR); Jeong Woo Lee, Daejeon (KR); Eun Young Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1550 days.

(21) Appl. No.: 11/529,973

(22) Filed: Sep. 29, 2006

(65) Prior Publication Data

US 2007/0104268 A1   May 10, 2007

(30) Foreign Application Priority Data

Nov. 10, 2005   (KR) .......................... 10-2005-0107616
May 12, 2006    (KR) .......................... 10-2006-0042834

(51) Int. Cl.
*H04N 11/04*   (2006.01)
*H04N 7/12*    (2006.01)

(52) U.S. Cl. ........... 375/240.24; 375/240.16; 375/240.2; 375/240.03

(58) Field of Classification Search ........................ None
See application file for complete search history.

(56) References Cited

U.S. PATENT DOCUMENTS

| 6,628,845 | B1  |   | 9/2003  | Stone et al.                  |
|-----------|-----|---|---------|-------------------------------|
| 7,535,961 | B2  | * | 5/2009  | Cho et al. ............ 375/240.12 |
| 2005/0025236 | A1 |   | 2/2005  | Yan et al.                    |
| 2006/0013298 | A1 | * | 1/2006  | Tong et al. ............ 375/240.03 |
| 2006/0133512 | A1 | * | 6/2006  | Park ...................... 375/240.25 |
| 2007/0009026 | A1 | * | 1/2007  | Kwon et al. ............ 375/240.03 |
| 2007/0263727 | A1 | * | 11/2007 | Sekiguchi et al. ....... 375/240.16 |

FOREIGN PATENT DOCUMENTS

JP            2-91505          7/1990
(Continued)

OTHER PUBLICATIONS

IEEE Transactions on Circuits and Systems for Video Technology, New Algorithms for the Estimation of Block Motion Vectors, vol. 3, No. 2, Apr. 1993, pp. 148-157.

(Continued)

*Primary Examiner* — Joseph Ustaris
*Assistant Examiner* — Frederick Bailey
(74) *Attorney, Agent, or Firm* — Blakely, Sokoloff, Taylor & Zafman (57) ABSTRACT

Provided are a coded block pattern (CBP) estimating method which is performed using an average value and a dispersion value between blocks of CBPs in a moving picture encoder for IP-TVs (Internet Protocol-Televisions), and a block mode decision method, which can determine all block modes with only the first 16×16 block. Accordingly, since an additional operation for mode determination is not necessary, an amount of calculation and thus a calculation time can be remarkably reduced.

4 Claims, 5 Drawing Sheets

FOREIGN PATENT DOCUMENTS

| | | |
|---|---|---|
| JP | 5-28311 | 4/1993 |
| JP | 2003-324731 | 11/2000 |
| KR | 1994-0024376 | 9/1994 |
| KR | 100175406 B1 | 11/1998 |
| KR | 100269129 B1 | 7/2000 |
| KR | 2000-0067684 | 11/2000 |
| KR | 20-0251386 | 11/2001 |
| KR | 1020050002979 A | 1/2005 |

OTHER PUBLICATIONS

IEEE Transactions on Circuits and Systems for Video Technology, Polynomial Search Algorithms for Motion Estimation, vol. 10, No. 5, Aug. 2000, pp. 813-818.

IEEE Transactions on Image Processing, Improved Interpolation, Motion Estimation, and Compensation for interlaced Pictures, vol. 3, No. 5, Sep. 1994, pp. 482-491.

* cited by examiner

METHOD OF ESTIMATING CODED BLOCK PATTERN AND METHOD OF DETERMINING BLOCK MODE USING THE SAME FOR MOVING PICTURE ENCODER

CROSS-REFERENCE TO RELATED PATENT APPLICATION

This application claims the benefit of Korean Patent Application No. 10-2005-0107616, filed on Nov. 10, 2005, and Korean Patent Application No. 10-2006-0042834, filed on May 12, 2006, in the Korean Intellectual Property Office, the disclosures of which are incorporated herein in their entirety by reference.

BACKGROUND OF THE INVENTION

1. Field of the Invention

The present invention relates to a method of estimating a coded block pattern (CBP) and a method of determining a block mode using the same for use in a moving picture encoder, and more particularly, to a coded block pattern (CBP) estimating method which is performed using an average value and a dispersion value between blocks of CBPs in a moving picture encoder for IP-TVs (Internet Protocol-Televisions), and a block mode decision method of reducing the number of H.264 encoding operations as much as possible and avoiding a reduction in picture quality.

2. Description of the Related Art

Digital video data is used in video conference apparatuses, high-definition televisions, Video-On-Demand (VOD) receivers, personal computers (PCs) supporting Moving Picture Experts Group (MPEG) video signals, game machines, terrestrial digital broadcasting receivers, digital satellite broadcasting receivers, cable televisions (CATVs), etc. Since an amount of digital video data is increased due to features of the digital video data and during the conversion of analog signals into digital signals, the digital video data is not used as it is but is compressed using an efficient compression method.

Three types of methods of compressing digital video data are widely used. These include a method of reducing temporal redundancy, a method of reducing spatial redundancy, and a method of reducing an amount of data by using statistical characteristics of codes generated. One of the methods of reducing temporal redundancy is a motion estimation and compensation method, which is used in most moving picture compression standards such as MPEG series and H.263.

Although a motion estimation and compensation method which is used to determine the most similar portion between a previous or future reference frame and a particular portion on a current frame, and transmits only a difference component between the two portions can reduce data more effectively since the difference component to be transmitted is reduced as a motion vector is found as accurately as possible, a considerable amount of estimation time and calculation is required in order to determine the most similar portion from the previous or future frame. Thus, ongoing research is being conducted into ways of reducing a motion estimation time that is the most time consuming when encoding moving pictures.

Meanwhile, there are two main types of motion estimation method: a pixel-by-pixel basis estimation method and a block-by-block basis estimation method, the latter of which is a representative algorithm which is most widely used.

The block-by-block basis estimation method is a method of dividing an image into blocks of a predetermined magnitude and finding a block which best matches a current image block within a search region of a previous image. A difference between the found block and the current image block is called a motion vector. The block-by-block basis estimation method is used to encode the motion vector and process the encoded motion vector. To calculate a match between two blocks, various match functions can be used. The most generally used match function is a Sum of Absolute Difference (SAD) function which sums all absolute values of differences between pixels in two blocks.

In the case of the H.264 CODEC, a search is performed using a Cost function based on a Rate Distortion Optimization (RDO) function instead of an existing SAD based search method. That is, the Cost function which is used to perform a search in the H.264 CODEC is a Rate-Distortion (RD) based Cost function which sums an existing SAD value and a value which is obtained by multiplying the number of encoded coefficients by a Lagrange multiplier. Here, the number of the encoded coefficients is determined by being substituted by a value proportional to a quantization coefficient value, and a Cost value is determined by multiplying the determined number of the encoded coefficients by a fixed Lagrange multiplier. Based on the Cost value, a search is performed.

Also, an H.264 moving picture encoder does not perform an encoding operation on a 16-to-16 large block basis or an 8-to-8 large block basis as in an existing moving picture encoder, in order to obtain a high compression efficiency and a high quality of picture, but is configured to select a mode having a minimum value among respective blocks with eight kinds of respectively different block modes.

However, since various kinds of encoding operations should not only be independently performed for each block mode but also main pixels and sub-pixels should be searched, in order to determine eight kinds of respectively different block modes, the H.264 moving picture encoder is required to make a large number of calculations and requires a large amount of calculation time in comparison with an existing moving picture encoding algorithm. Therefore, if a number of operations for determination of a block mode is reduced to a minimum value, operation time can be reduced and deterioration of picture quality can be avoided. Accordingly, a moving picture encoder for IP-TVs can be implemented.

As conventional art, U.S. patent Publication No. 2003-633273 (Feb. 3, 2005), U.S. Pat. No. 6,628,845 (Sep. 30, 2003), Korean Patent Publication No. 01-75406 (Apr. 29, 2004), Korean Patent Publication No. 02-69129 (Oct. 16, 2000), and Korean Patent Publication No. 03-42350 (Jun. 27, 2003), have been disclosed, but do not teach a technology of estimating a CBP (Coded Block Pattern) value in advance and estimating and determining P and B block modes.

SUMMARY OF THE INVENTION

The present invention provides a Coded Block Pattern (CBP) estimation method for use in a moving picture encoder for internet protocol TVs (IP-TVs).

The present invention also provides a method of determining a block mode using a Coded Block Pattern (CBP) estimation method for use in a moving picture encoder for internet protocol TVs (IP-TVs), thereby reducing the number of H.264 encoding operations as much as possible and avoiding a reduction in picture quality.

To accomplish the above objective of the present invention, there is provided a CBP (Coded Block Pattern) estimation method for use in a moving picture encoder, that is, an H.264 moving picture encoder for internet protocol TVs (IP-TVs) according to definition of the CBP, and a method of determining blocks of eight modes through the estimated CBPs.

According to an aspect of the present invention, there is provided a Coded Block Pattern (CBP) estimation method comprising:

estimating motion in units of a macroblock of 16×16 pixel size, to thus determine a current macroblock and a reference macroblock corresponding to the current macroblock;

calculating an average value and a dispersion value of individual 4×4 blocks in the current macroblock and corresponding 4×4 blocks in the reference macroblock which have been determined by estimation without performing a separate discrete cosine transform (DCT) operation; and estimating CBP (Coded Block Pattern) values of the 4×4 blocks in the current macroblock using the calculated average and dispersion values.

Preferably, the average value is calculated using an equation (2) and the dispersion value is calculated using an equation (3) as follows, $$m_{4\times 4} = \sum_{i=0}^{3}\sum_{j=0}^{3}(P(i,j,t-1)-\overline{P}(i,j,t)) \quad (2)$$

$$V_{4\times 4} = \frac{1}{16}\sum_{i=0}^{3}\sum_{j=0}^{3}(P(i,j,t-1)-m_{4\times 4})^2 \quad (3)$$

wherein
$P(i,j,t-k)$ is a pixel value of an $i^{th}$ column and $j^{th}$ row point at a time of $t-k$ in a unit 4×4 block, and
$\overline{P}(i,j,t)$ is a pixel value of an $i^{th}$ column and $j^{th}$ row point in a 4×4 block estimated through the $P(i,j,t-k)$.

More preferably, the CBP values estimation process is performed using an equation (4) as follows, $$ECBP = \frac{m_{4\times 4}\cdot Q((QP+12)\ \%\ 6,0,0)+2f}{2^{16+\frac{QP+12}{6}}} + u(V_{4\times 4}-(15-\theta_t)) \quad (4)$$

wherein
$u(x)$ is a unit step function which is equal to one if $x \geq o$ and otherwise is equal to zero, and $\theta$ is a parameter introduced for CBP estimation and is adaptively updated according to an equation (5) as follows, $$\theta_{t+1}\theta_t+\epsilon g(ECBP-CBP)\cdot(1-g(ECBP-CBP)) \quad (5)$$

wherein $\epsilon$ is an adaptation coefficient and is selected as an arbitrary value between 0.1 and 0.25, CBP is an actual CBP value obtained after undergoing DCT and quantization processes in a determined block mode, a function $g(x)$ is expressed as the following equation $$g(x) = \frac{1}{1+\exp(-\lambda \cdot x)}$$

wherein a coefficient $\lambda$ is an arbitrary value not less than 4.6, and an estimated CBP has a value of zero or one.

According to another aspect of the present invention, there is also provided a method of determining a block mode for performing a motion compensation process using CBP (Coded Block Pattern) values which are estimated using a CBP estimation method claimed in any one of Claims 1 to 3, the method comprising:

(a) determining a block mode without performing an additional motion estimation (ME) process and corresponding 4×4 blocks, among block modes which are configurable with 4×4 blocks constituting a current macroblock, based on estimated CBP values of the current macroblock;

(b) performing an additional motion estimation process with respect to 4×4 blocks corresponding to a block mode for which the additional motion estimation process is needed;

(c) estimating CBP values with respect to the 4×4 blocks of the block mode for which the additional motion estimation process has been performed in said step (b); and (d) determining a block mode without performing an additional motion estimation (ME) process and corresponding 4×4 blocks, among block modes which are configurable with 4×4 blocks constituting a current macroblock, based on estimated CBP values of the current macroblock including the estimated CBP values obtained in said step (c).

Preferably, the block modes which are configurable with the 4×4 blocks is a 16×16 block mode, a 16×8 block mode, a 8×16 block mode, a 8×8 block mode, a 8×4 block mode, and a 4×8 block mode, and wherein said step (a) comprises determining the corresponding block mode into a block mode having no need to perform an additional motion estimation process, if the number of ones in the estimated CBP values of the 4×4 blocks respectively corresponding to the 16×16 block mode, the 16×8 block mode, the 8×16 block mode, the 8×8 block mode, the 8×4 block mode, and the 4×8 block mode is equal to or less than a predetermined number.

BRIEF DESCRIPTION OF THE DRAWINGS

The above and other objects and advantages of the present invention will become more apparent by describing the preferred embodiments thereof in more detail with reference to the accompanying drawings in which.

DETAILED DESCRIPTION OF THE INVENTION

Hereinafter, the present invention will be described in detail by explaining embodiments of the invention with reference to the attached drawings.

Figure 1:
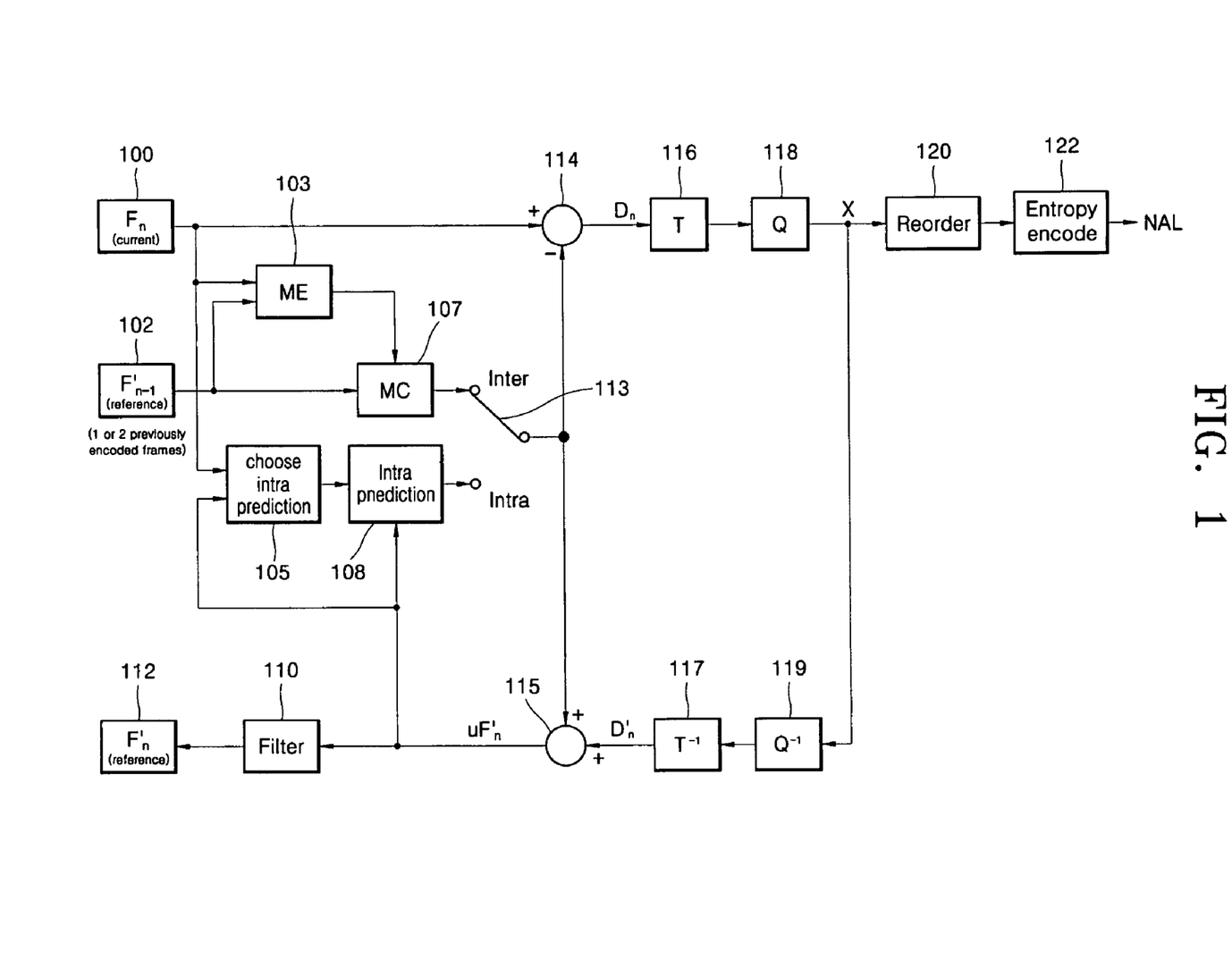
FIG. 1 is a block diagram of a moving picture encoder for Internet Protocol-Televisions (IP-TVs) (see H.264 and MPEG-4 Video Compression: Video Coding for Next-Generation Multimedia', Iain E. G. Richardson, Wiley, 2003)

FIG. 1 is a block diagram of a moving picture encoder for Internet Protocol-Televisions (IP-TVs) (see H.264 and MPEG-4 Video Compression: Video Coding for Next-Generation Multimedia', Iain E. G. Richardson, Wiley, 2003). Referring to FIG. 1, a motion estimator 103, denoted as a block ME, is divided into a main pixel estimator which estimates a motion vector in units of a main pixel and a sub-pixel estimator which estimates a motion vector in units of an optimal half-pixel or in units of an optimal quarter-pixel based on a motion vector of a found main pixel.

In FIG. 1, a current image 100 is represented as Fn (Current), images 102 restored by a motion compensated in an encoder before one unit hour are represented as F'n−1 (Referenced), and a restored image with respect to the current image 112 (an image decoded in a decoder) is represented as F'n, in which n is a time index.

In FIG. 1, a block labelled as MC denotes a motion compensator 107. Also, a block labelled as choose intraprediction denotes a prediction mode determiner 105 for INTRA (I image) prediction called intraprediction.

In the case of H.264 standards, four prediction modes exist in a 16×16 luminance image and an 8×8 chrominance image, and nine prediction modes exist in a 4×4 image. Among them, one prediction mode should be selected and the selected prediction mode should be transferred to a block 108 labelled as Intra Prediction.

The block 108 labelled as Intra Prediction is an intrapredictor which uses an intraprediction mode predicted in the Choose intraprediction block 105, and produces an intraprediction value. A switch 113 is connected to the motion compensator 107 in an interprediction mode, and the intrapredictor 108 in an intraprediction mode.

Also, a block 116 labelled as "T" is used for performing a Discrete Cosine Transform (DCT) operation, and performs basic integer 4×4 prediction in the case of H.264. A quantizer 118 labelled as "Q" is used for quantizing a DCT transformed value. A block 120 labelled as "Reorder" is used for zigzag-scanning a value output from the quantizer 118 in order to compress the quantized value into a variable length coded value or Context-based Adaptive Binary Arithmetic Coding (CABAC)

An entropy encoder 122 is used for compressing data using a Huffman coder or CABAC.

A block 119 labelled as $Q^{-1}$ is an inverse quantizer which performs a function inverse to that of the quantizer 118.

A block 117 labelled as $T^{-1}$ is an inverse DCT converter which performs an inverse DCT function of data which has passed through the inverse quantizer 119.

Using the inverse quantizer 119 and the inverse DCT converter 117, image restoration known as motion compensation is performed in which data having a quantization error is added to predicted data.

A filter 110 filters a primarily restored image, and plays a role of reducing picture quality by filtering an image having a quantization error or block phenomenon. An image that has passed through the filter 110 is a restored image, and is identical to an image decoded by a decoder. The image having passed through the filter 110 is stored in a block 112 labelled as F'n (reference). When a next image of a frame is encoded, the frame image is referenced as F'n−1.

A signal Dn input to the DCT converter 116 is a difference image in the form of a difference frame, that is, obtained by a difference between an original image and a predicted image in a subtracter 114.

An output uF'n of an adder 115 is a restored image which is not filtered, that is, the restored image is obtained by adding a difference image to data D'n which has passed through the inverse quantizer 119 and the inverse DCT converter 117.

The present invention is applied to the motion estimator 103 and the motion compensator 107 in FIG. 1.

The motion estimator 103 is divided into a main pixel estimator which performs a main pixel search and a sub-pixel estimator which performs a sub-pixel search in which the sub-pixel estimation is performed after the main pixel estimation has been performed.

An adaptive coded block pattern (CBP) estimation method and a block mode determination method using the adaptively estimated CBP for use in an H.264 encoder according to an embodiment of the present invention will now be described with reference to the accompanying drawings FIGS. 4-6.

First, in order to better understand the present invention, differences between the prior art and the present invention will be described below.

In the prior art, 4×4 DCT and quantization processes are performed in order to extract CBPs and obtain the CBPs using the process results. Then, the obtained CBPs are used to determine a skip mode in a P frame or a direct mode in a B frame. In the case of the modes other than the 4×4 mode shown in FIG. 2, main pixel and sub-pixel estimations are performed and a rate distortion operation due to the results of the main pixel and sub-pixel estimations is performed, to thereby select a mode having a minimized rate distortion value.

Figure 2:
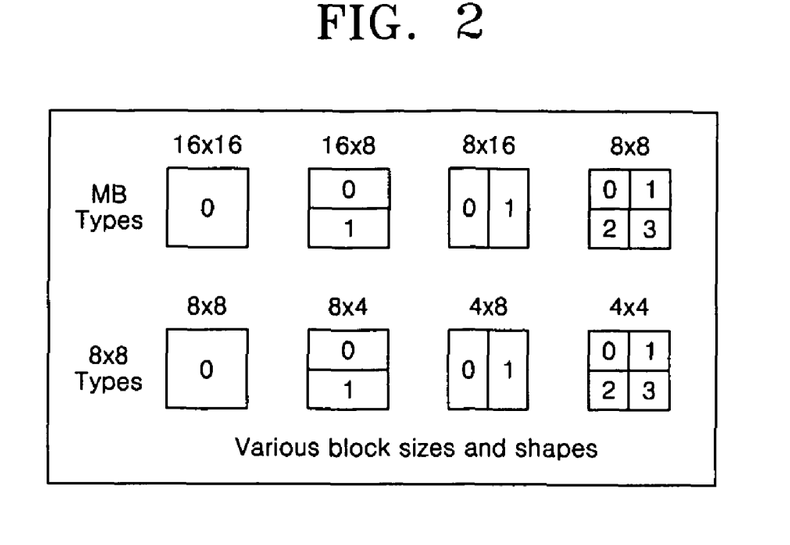
FIG. 2 is a diagram for explaining the use of H.264 block modes, showing a large-block division mode which is used for an H.264 video CODEC, according to an embodiment of the present invention.

FIG. 2 is a diagram for explaining the use of H.264 block modes according to an embodiment of the present invention, showing a large-block division mode which is used for an H.264 video CODEC. FIG. 2 shows a block mode of an H.264 large-block. In the prior art block mode selection method, a motion estimation (ME) for a 16×16 block is performed once. Then, a motion estimation (ME) for a 16×8 block is performed twice, a motion estimation (ME) for an 8×16 block is performed twice, a motion estimation (ME) for an 8×8 block is performed four times, a motion estimation (ME) for an 8×4 block is performed eight times, a motion estimation (ME) for a 4×8 block is performed eight times, and a motion estimation (ME) for a 4×4 block is performed sixteen times. That is, a motion estimation is performed a total of forty-one times. A block mode having the smallest Sum of Absolute Difference (SAD) or (Mean Square Error) MSE is selected among the forty-one motion estimation results. This becomes a main factor which lowers an H.264 encoding speed.

Meanwhile, according to an embodiment of the present invention block mode is determined in a manner that after motion estimation of main pixels and sub-pixels in a first 16×16 block mode has been completed, an average value and a dispersion value are obtained with respect to a block determined by the motion estimation without performing a separate DCT operation. Then a CBP value is predicted using the average value and the dispersion value to thereby determine a block mode with the predicted CBP value. Accordingly, instead of main pixels, sub-pixels, and a rate distortion operation for each mode, a block mode is determined through a combination of 4×4 blocks where a CBP value is one.

The principle of the present invention will be described in detail using the following equations. In general, a CBP is determined as follows.

First, assuming that $X \in R^{4\times 4}$ is a result of performing a DCT operation of 4×4 pixel data whose motion is compensated, a CBP is obtained using a quantization process of the following equation (1) using an element of $X \in R^{4\times 4}$.

$$X_Q(i, j) = \frac{X(i, j) \cdot Q((QP+12) \% 6, i, j) + 2f}{2^{16+\frac{QP+12}{6}}} \quad (1)$$

Here, i and j are the $i^{th}$ column element and the $j^{th}$ row element of $X \in R^{4\times 4}$,
$X_Q(i,j)$ is the $i^{th}$ column element and the $j^{th}$ row element of quantized $X \in R^{4\times 4}$, $$\underset{\cup}{X}(i, j)$$

is the $i^{th}$ column element and the $j^{th}$ row element of $X \in R^{4\times 4}$ before being quantized, QP is a quantization coefficient of H.264,
$Q((QP+12)\% 6, i, j)$ is a function of QP, i and j, and is a quantization function determined by a remainder which is obtained by dividing a result of adding twelve (12) to the quantization coefficient into six (6) and $i^{th}$ and $j^{th}$ elements, and f is a quantization level offset value in equation (1).

In equation (1), the CBP is determined using a quantization process whereby a CBP value of a 4×4 block becomes one if any of the quantization coefficients does not equal zero and otherwise the CBP value is zero.

Figure 3:
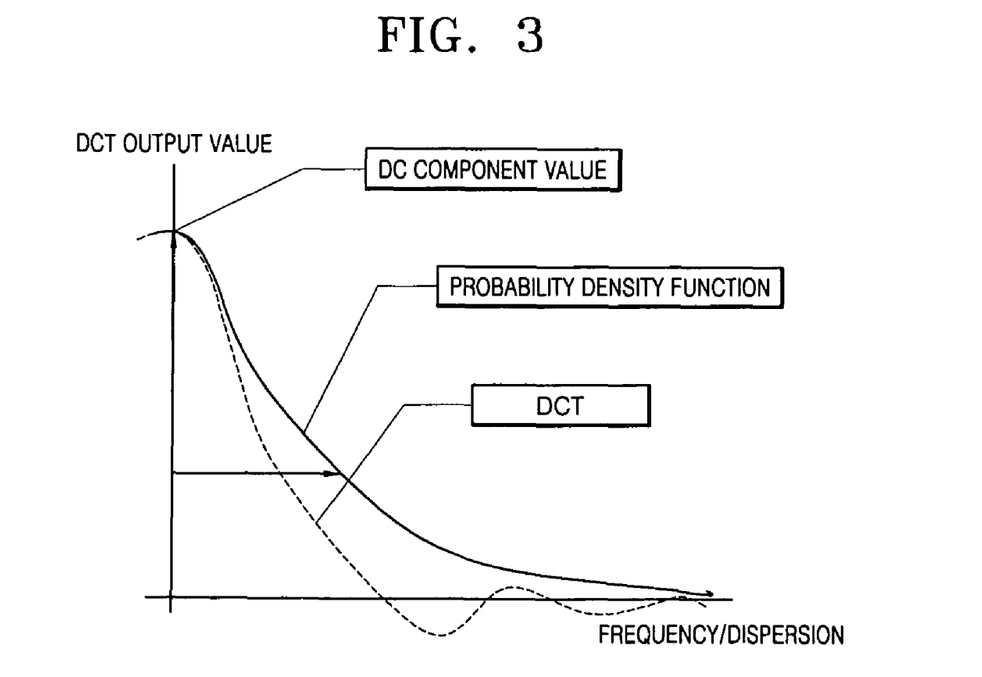
FIG. 3 is a graph illustrating average values or DC components of DCT values which are portions having a maximum value where a frequency/dispersion value (X) and a DCT output value (Y) cross each other, by comparing a one-dimension DCT output value with a Gaussian probability density function, which is a conceptual view showing a similarity between the DCT and the probability density function for CBP estimation.

The CBP is predicted through averaging and dispersing as shown in FIG. 3, in which a DCT operation result is regarded as a result of a two-dimensional probability density function.

FIG. 3 is a graphical view showing average values or DC components of DCT values which are portions having a maximum value where a frequency/dispersion value (X) and a DCT output value (Y) cross each other, by comparing a one-dimension DCT output value with a Gaussian probability density function, which is a conceptual view showing a similarity between the DCT and the probability density function for CBP estimation.

That is, as shown in FIG. 3, a one-dimensional DCT output value is compared with a Gaussian probability density function, and a portion having a maximum value where an X-axis value crosses a Y-axis value becomes an average or DC component of a DCT result.

Here, the average value equals a DC component of a 4×4 DCT operation. In the case of the remaining AC components exclusive of the DC component, the CBP is predicted to be one if a dispersion value exceeds a threshold value which is adaptively determined, and otherwise the CBP is predicted to be zero.

The average value is calculated using the following equation (2) and the dispersion value is calculated using the following equation (3), $$m_{4\times 4} = \sum_{i=0}^{3} \sum_{j=0}^{3} (P(i, j, t-1) - \overline{P}(i, j, t)) \quad (2)$$

-continued $$V_{4\times 4} = \frac{1}{16} \sum_{i=0}^{3} \sum_{j=0}^{3} (P(i, j, t-1) - m_{4\times 4})^2. \quad (3)$$

In equations (2) and (3),
$P(i,j,t-k)$ is a pixel value of an $i^{th}$ column and $j^{th}$ row point at a time of t−k in a unit 4×4 block, and
$\overline{P}(i,j,t)$ is a pixel value of an $i^{th}$ column and $j^{th}$ row point in a 4×4 block estimated using
$P(i,j,t-k)$ A CBP estimation process is performed using the following equation (4), $$ECBP = \frac{m_{4\times 4} \cdot Q((QP+12) \% 6, 0, 0) + 2f}{2^{16+\frac{QP+12}{6}}} + u(V_{4\times 4} - (15 + \theta_t)) \quad (4)$$

In equation (4), $$\underset{\cup}{u}(x)$$

is a unit step function which is one if $x \geq o$ and otherwise is zero, and θ is a parameter introduced for CBP estimation and is adaptively updated according to the following equation (5), $$\theta_{t+1} = \theta_t + \epsilon g(ECBP-CBP) \cdot (1-g(ECBP-CBP)) \quad (5).$$

In equation (5), ε is an adaptation coefficient and is selected as an arbitrary value between 0.1 and 0.25, CBP is an actual CBP value obtained after undergoing DCT and quantization processes in a determined block mode, a function $g(x)$ is expressed as the following equation $$g(x) = \frac{1}{1 + \exp(-\lambda \cdot x)}$$

where a coefficient λ is an arbitrary value not less than 4.6 and an estimated CBP has a value of zero or one.

Figure 4:
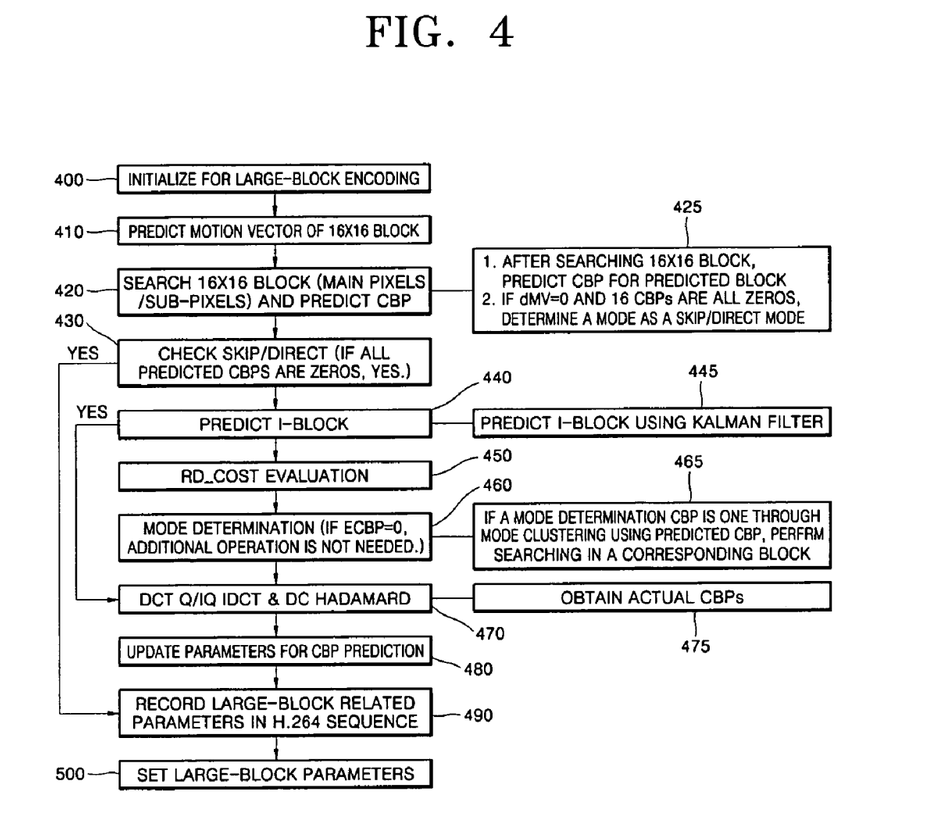
FIG. 4 is a flowchart illustrating a block mode determination method for CBP estimation according to an embodiment of the present invention.

FIG. 4 is a flowchart illustrating a block mode determination method for CBP estimation according to an embodiment of the present invention. In FIG. 4, the moving picture encoder of FIG. 1 performs an initialization process for a large-block encoding operation (step 400), predicts a motion vector (MV) of a 16×16 block (step 410), and predicts a CBP by searching main pixels and sub-pixels of a 16×16 block (step 420). In step 420, a CBP is predicted with respect to the block predicted after searching the main pixels and sub-pixels of a 16×16 block. If a value differentiating a motion vector is zero (dMV=0), and sixteen CBPs are all zeros, in step 420, it is judged that a current mode is a SKIP/Direct mode as illustrated in a reference box 425.

If the predicted CBPs are all zeros when checking the SKIP/Direct mode in step 430, the program proceeds to step 480 and records a large-block related parameter on an H.264 sequence.

If none of the predicted CBPs are zeros when checking the SKIP/Direct mode in step 430, the program proceeds to step 440 and predicts whether or not a block is an I-block. Here, if a block is an I-block, the program proceeds to step 470. In step 440, it is predicted whether or not a block is an I-block using a Kalman filter as illustrated in a reference box 445.

If a block is not an I-block in step 440, the program proceeds to step 450, and performs a RD_cost evaluation. Then, in step 460, it is determined which mode is a current mode. Here, if ECBP=0, an additional operation is not necessary. In this case, if a CBP for mode determination is one through mode clustering with the predicted CBPs, a search operation is performed at a corresponding block as illustrated in a reference box 465.

In step 470, a DCT Q/IQ IDCT operation and a DC Hadamard operation are performed after undergoing step 460 or if an I-block is predicted in step 440. In step 470, an actual CBP is obtained as illustrated by a reference box 475.

In step 480, a parameter for CBP prediction is updated. In step 490, a large-block related parameter is recorded on an H.264 sequence, after undergoing step 480 or if the predicted CBPs are all zeros in step 430. Then, the program proceeds to step 500, and performs a large-block parameter setting operation.

Meanwhile, in the case of the CBP prediction as represented in equation (5), a mode determination process is performed using the modes illustrated in FIG. 2, and parameters are updated through actual CBPs obtained through the DCT and quantization processes. Block modes using the predicted CBPs can be represented as illustrated in FIG. 5. Accordingly, if a clustering algorithm illustrated in FIG. 6 is introduced, a block mode is determined without undergoing an additional searching process in the case of a block that the predicted CBP is zero, but an additional searching process is performed only for a block in which that the predicted CBP is one, to thereby determine a block mode having a higher compression efficiency.

Figure 5:
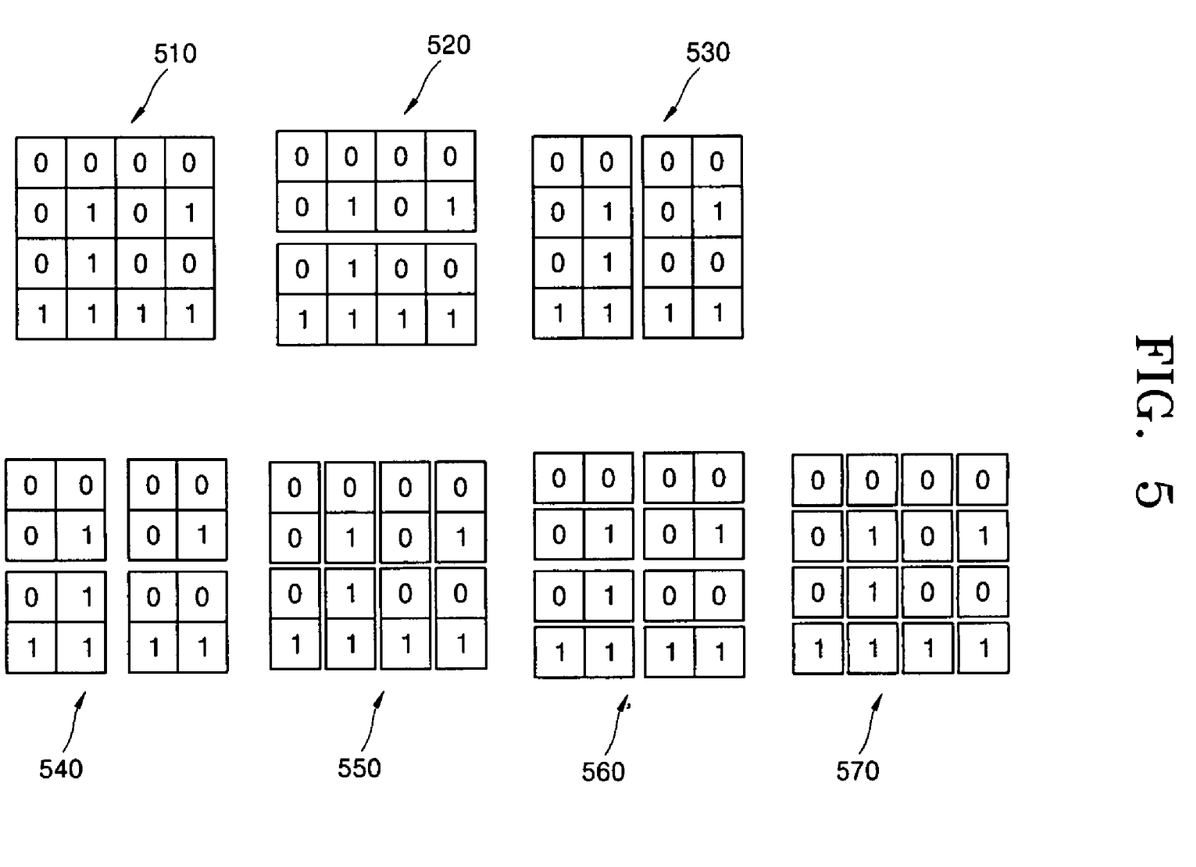
FIG. 5 shows diagrams for explaining a block mode determination method for estimated CBPs according to an embodiment of the present invention, and illustrates examples of CBP distribution according to an H.264 large-block division mode when CBPs are estimated in a large-block.

FIG. 5 shows diagrams for explaining a block mode determination method for estimated CBPs according to an embodiment of the present invention, and illustrates examples of CBP distribution according to an H.264 large-block division mode when CBPs are estimated in a large-block.

In FIG. 5, a upper-leftmost block mode pattern 510 illustrates a CBP obtained using a motion compensation (MC) process after finishing a motion estimation (ME) process for a 16×16 large-block. Since a CBP has a value of one or zero in units of a 4×4 block, a 16×16 large-block has values as represented in the upper-leftmost block mode pattern 510. If CBP=zero, all data values appearing in the processes of DCT and quantization of a 4×4 block are all zeros. Therefore, in the case that CBP is zero, it is not necessary to perform motion estimation (ME) for an additional next block mode. The remaining diagrams in FIG. 5 represent a CBP distribution for each large-block mode. If the number of the cases in which CBP is one in each large-block mode is one or smaller than two, it is not necessary to perform additional motion estimation (ME) for each block mode. In FIG. 5, an upper-middle block mode pattern 520 represents a CBP distribution for a 16×8 block mode. In comparison with a 16×16 block mode case, only two blocks are ones and the other blocks are zeros in an upper-end 16×8 block CBP. Therefore, in the case of the upper-end 16×8 block CBP, an additional motion estimation for each mode may not be necessary. An upper-rightmost block mode pattern 530 represents an 8×16 block. In the case of left-hand and right-hand 8×16 blocks in the upper-rightmost block mode pattern 530, four or three blocks are ones in the CBP, respectively. Thus, an 8×16 mode cannot be selected.

In FIG. 5, a lower-leftmost block mode pattern 540 is a pattern for an 8×8 block mode. Since the number of cases in which CBP values are ones is one in the two upper-end 8×8 blocks, an additional motion estimation (ME) is not necessary, but since the number of cases in which CBP values are ones is three and two, respectively, in the two lower-end 8×8 blocks, an additional motion estimation (ME) is necessary.

In FIG. 5, a lower-second-leftmost block mode pattern 550 represents an 8×4 block mode. Assuming that an additional motion estimation (ME) is not performed only when CBP values are all zero in the case that a block is a block mode smaller than 8×8, the number of blocks for which there is no need to perform an additional motion estimation (ME) is only two.

In FIG. 5, a lower-second-rightmost block mode pattern 560 represents a 4×8 block mode. Likewise, assuming that an additional motion estimation (ME) is not performed only when CBP values are all zero, only three 4×8 blocks in the block mode pattern 560 need not perform additional motion estimation (ME).

In FIG. 5, a lower-rightmost block mode pattern 570 represents a 4×4 block mode. Nine blocks whose values are zero in the CBP values, respectively, among the sixteen 4×4 blocks, need not perform motion estimation (ME).

Figure 6:
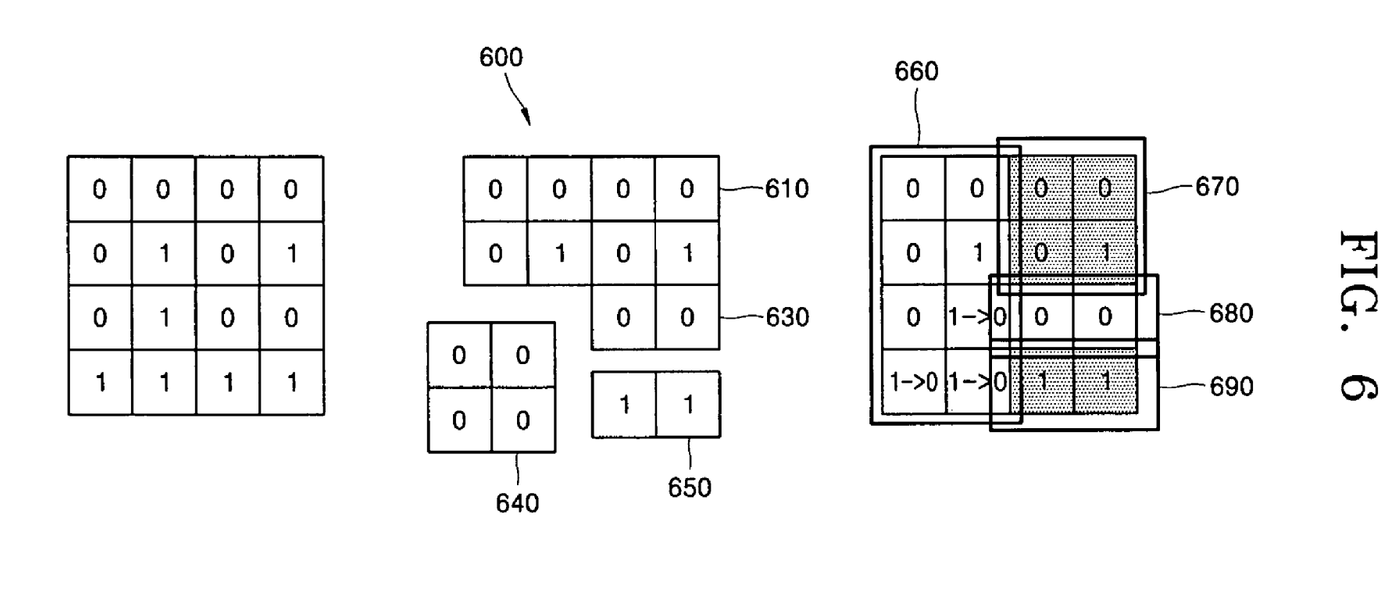
FIG. 6 shows diagrams for explaining that a large-block division mode is determined according to an embodiment of the present invention when CBPs are estimated in a large-block shown in FIG. 5, and is a conceptual view of performing clustering for determination of block modes using estimated CBPs according to an embodiment of the present invention.

FIG. 6 shows diagrams for explaining that a large-block division mode is determined according to an embodiment of the present invention when CBPs are estimated in the large-block shown in FIG. 5, which is a conceptual view of performing clustering for determination of block modes using estimated CBPs according to an embodiment of the present invention.

Referring to FIG. 6 based on the FIG. 5 information, an upper 16×8 block 610 and a lower-middle 4×8 block 630, illustrated in a middle diagram 600 of FIG. 6, need not perform an additional motion estimation (ME). Thus, a lower-left 8×8 block 640 and a bottom-right 4×8 block 650 should perform an additional moving estimation (ME). It is assumed that CBP values are all changed from ones to zeros in the 8×8 block 640 after the additional motion estimation, and two blocks are still ones in the 4×8 block 650 despite the additional motion estimation (ME) having been performed. In this assumption, each mode configuration can be again grouped. That is, since only one block whose CBP value is one exists in a left 8×16 block 660, the left 8×16 block 660 can be selected. Also, since there is only one block whose CBP value is one in an upper 8×8 block 670 from a right 8×16 block, the upper 8×8 block 670 can be also selected. In the case of a lower 8×8 block, since there are two blocks both of which CBP values are zeros in an upper 8×4 block 680, the upper 8×4 block 680 can be selected. However, since CBP values are all ones although motion estimation has been performed in the case of a lower 8×4 block 690, additional motion estimation (ME) is not performed in this state.

As described above, a coded block pattern (CBP) estimating method which is performed using an average value and a dispersion value between blocks of CBPs in a moving picture encoder for IP-TVs (Internet Protocol-Televisions), and a block mode decision method according to the present invention can determine all block modes with only the first 16×16 block. Accordingly, since an additional operation for mode determination is not necessary, the amount of calculation and thus, calculation time can be remarkably reduced.

While this invention has been particularly shown and described with reference to embodiments thereof, it will be understood by those skilled in the art that various changes in form and details may be made therein without departing from the spirit and scope of the invention as defined by the appended claims.

What is claimed is:

1. A Coded Block Pattern (CBP) estimation method comprising:

estimating motion in units of a macroblock of 16×16 pixel size, to thus determine a current macroblock and a reference macroblock corresponding to the current macroblock;

calculating an average value and a dispersion value of individual 4×4 blocks in the current macroblock and corresponding 4×4 blocks in the reference macroblock which have been determined by estimation without performing a separate discrete cosine transform (DCT) operation; and estimating CBP (Coded Block Pattern) values of the 4×4 blocks in the current macroblock using the calculated average and dispersion values, wherein the average value is calculated using an equation (2) and the dispersion value is calculated using an equation (3) as follows, $$m_{4\times 4} = \sum_{i=0}^{3}\sum_{j=0}^{3}(P(i,j,t-1) - \overline{P}(i,j,t)) \quad (2)$$

$$V_{4\times 4} = \frac{1}{16}\sum_{i=0}^{3}\sum_{j=0}^{3}(P(i,j,t-1) - m_{4\times 4})^2 \quad (3)$$

wherein
$P(i,j,t-1)$ is a pixel value of an $i^{th}$ column and $j^{th}$ row point of t-1 frame in said unit 4×4 block, and
$\overline{P}(i,j,t)$ is a pixel value of an $i^{th}$ column and $j^{th}$ row point of t frame in said 4×4 block estimated through the $P(i,j,t-1)$.

2. The CBP estimation method of claim 1, wherein the CBP values estimation process is performed using an equation (4) as follows, $$ECBP = \frac{m_{4\times 4} \cdot Q((QP+12) \% 6, 0, 0) + 2f}{2^{16 + \frac{QP+12}{6}}} + u(V_{4\times 4} - (15 + \theta_t)) \quad (4)$$

wherein
$u(x)$ is a unit step function which is equal to one if $x \geq o$ and otherwise is equal to zero, and $\theta$ is a parameter introduced for CBP estimation and is adaptively updated according to an equation (5) as follows, $$\theta_{t+1} = \theta_t + \epsilon g(ECBP-CBP) \cdot (1-g(ECBP-CBP)) \quad (5)$$

wherein $\epsilon$ is an adaptation coefficient and is selected as an arbitrary value between 0.1 and 0.25, CBP is an actual CBP value obtained after undergoing DCT and quantization processes in a determined block mode, a function $g(x)$ is expressed as the following equation $$g(x) = \frac{1}{1 + \exp(-\lambda \cdot x)}$$

wherein a coefficient $\lambda$ is an arbitrary value not less than 4.6, and an estimated CBP has a value of zero or one.

3. A method of determining a block mode for performing a motion compensation process using CBP (Coded Block Pattern) values which are estimated using a CBP estimation method claimed in any one of claims 1 to 2, the method comprising:

(a) determining a block mode without performing an additional motion estimation (ME) process and corresponding 4×4 blocks, among block modes which are configurable with 4×4 blocks constituting a current macroblock, based on estimated CBP values of the current macroblock;

(b) performing an additional motion estimation process with respect to 4×4 blocks corresponding to a block mode for which the additional motion estimation process is needed;

(c) estimating CBP values with respect to the 4×4 blocks of the block mode for which the additional motion estimation process has been performed in said step (b); and (d) determining a block mode without performing an additional motion estimation (ME) process and corresponding 4×4 blocks, among block modes which are configurable with 4×4 blocks constituting a current macroblock, based on estimated CBP values of the current macroblock including the estimated CBP values obtained in said step (c).

4. The block mode determination method of claim 3, wherein the block modes which are configurable with the 4×4 blocks is a 16×16 block mode, a 16×8 block mode, a 8×16 block mode, a 8×8 block mode, a 8×4 block mode, and a 4×8 block mode, and wherein said step (a) comprises determining the corresponding block mode into a block mode having no need to perform an additional motion estimation process, if the number of ones in the estimated CBP values of the 4×4 blocks respectively corresponding to the 16×16 block mode, the 16×8 block mode, the 8×16 block mode, the 8×8 block mode, the 8×4 block mode, and the 4×8 block mode is equal to or less than a predetermined number.

* * * * *